United States Patent
Wicks et al.

[11] Patent Number: 5,999,822
[45] Date of Patent: Dec. 7, 1999

[54] CELLULAR TELEPHONE WITH EXTENDIBLE MICROPHONE

[75] Inventors: James E. Wicks; Yutaka Hasegawa, both of San Fransisco, Calif.

[73] Assignees: Sony Corporation, Tokyo, Japan; Sony Electronics, Inc., Park Ridge, N.J.

[21] Appl. No.: 08/816,938

[22] Filed: Mar. 14, 1997

[51] Int. Cl.⁶ .................................................. H04Q 7/20
[52] U.S. Cl. ............................................. 455/550; 455/90
[58] Field of Search .................................. 455/403, 550, 455/575, 90; D14/138, 137; 379/433, 434, 428; 381/361, 365, 355–358, 91, 122, 362

[56] References Cited

U.S. PATENT DOCUMENTS

| | | |
|---|---|---|
| D. 298,035 | 10/1988 | Watanabe . |
| D. 319,234 | 8/1991 | Konno et al. . |
| D. 326,451 | 5/1992 | Roegner . |
| D. 328,070 | 7/1992 | Seay . |
| D. 336,472 | 6/1993 | Lin . |
| D. 337,764 | 7/1993 | Paton et al. . |
| D. 346,172 | 4/1994 | Fields et al. ............................ D14/137 |
| D. 350,744 | 9/1994 | Hino ...................................... D14/138 |
| D. 352,708 | 11/1994 | Rossi . |
| D. 356,085 | 3/1995 | Fellinger . |
| D. 369,796 | 5/1996 | Grewe .................................... D14/138 |
| D. 385,554 | 10/1997 | Nuovo et al. ........................... D14/138 |
| D. 390,555 | 2/1998 | Finke-Anlauff ........................ D14/138 |
| D. 392,287 | 3/1998 | Hino ...................................... D14/138 |
| D. 395,299 | 11/1996 | Yamazaki et al. ..................... D14/138 |
| D. 408,814 | 5/1998 | Wicks et al. ........................... D14/138 |
| 5,054,051 | 10/1991 | Hoff . |
| 5,197,091 | 3/1993 | Takagi et al. ........................... 455/433 |
| 5,280,635 | 1/1994 | Knoedler et al. ...................... 455/129 |
| 5,335,274 | 8/1994 | Masuda et al. ........................ 379/433 |
| 5,404,390 | 4/1995 | Tamura . |
| 5,440,629 | 8/1995 | Gray ...................................... 379/433 |
| 5,446,789 | 8/1995 | Loy et al. ............................... 379/433 |
| 5,504,813 | 4/1996 | Takasaki ................................ 379/433 |
| 5,715,311 | 2/1998 | Sudo et al. ............................. 455/403 |
| 5,841,859 | 12/1996 | Chen ...................................... 379/433 |

*Primary Examiner*—William G. Trost
*Assistant Examiner*—Jean A. Gelin
*Attorney, Agent, or Firm*—Ronald P. Kananen; Rader, Fishman & Grauer

[57] ABSTRACT

A microphone art for a cellular telephone has a first tubular member telescoping with a second tubular member secured to a face of the cellular telephone. The tubular members are preferably arcuately-shaped, similar to a face of the telephone, and spring-loaded so that releasing a detent permits the second tubular member to extend from the first under the influence of a spring.

14 Claims, 3 Drawing Sheets

CELLULAR TELEPHONE WITH EXTENDIBLE MICROPHONE

FIELD OF THE INVENTION

The present invention relates generally to the field of wireless telephony. More specifically, the present invention relates to a cellular telephone with an extendible arm for a microphone. Still more particularly, this invention relates to a cellular telephone with a telescoping, extendible arm which is arcuately-shaped along its length congruently with a shape of a face of the cellular telephone. Still more particularly, this invention relates to such a cellular telephone in which the microphone arm is telescoping and spring loaded to extend upon release of a locking member.

BACKGROUND OF THE INVENTION

Since their introduction, wireless communication systems including pagers, cellular telephones and low-tier radio telephones, have become increasingly popular. Such devices provide an extremely convenient means for communication.

Wireless communication systems, particularly cellular telephones and low-tier radio telephones, are convenient because they allow their users to save time. The user of a wireless telephone unit need not waste time looking for an available telephone in order to place a call. A wireless telephone unit also allows its user to take advantage of time spent traveling. For example, with a wireless telephone, the user can be transacting business or making appointments while driving, riding or walking.

A representative portable cellular telephone with accessories is commercially available from SONY as model CM-RX100, as representatively shown in FIGS. 1 to 4. As seen in FIG. 1, the cellular telephone designated generally by the reference numeral 10 includes a power switch 11 for turning the cellular telephone 10 on or off. An incoming indicator 12 flashes when receiving a call to apprise the user of incoming traffic. A dial shuttle 13 recalls the speed dialing number and the last dialed numbers when turned up or down in the standby mode. When pressed, the dial shuttle 13 enters the function mode F and can then be turned up or down for selection. By pressing the dial shuttle 13 for one second, a function menu is automatically scrolled. Scrolling may be terminated by pressing any button except the power switch 11. A display 14 is provided on the face of the telephone 10.

A keypad 10a is included with a STORE button 15 for storing a phone number and a CLEAR button 16 which releases the number or letter entered and exits the mode when pressed for one second. The keypad 10a also includes the conventional buttons for numerals 1 to 9 and 0, with star and # buttons.

An antenna 18 in an antenna socket 19 is extendable or fixed to receive or transmit telephony. A ringer is shown at numeral 20, with a speaker 21. An ABC button on the face of the telephone 10 is used to enter and exit the alphabetical mode; a RECALL button 24 recalls a stored phone number; a SEND button 25 is used to make a call and also used for conferences and interrupt calls; and an END button is used to end calls or exit the mode. As shown in the bottom view seen in FIG. 3, a connector 27 connects optional car batter cord or handsfree kit and a battery charge contact 28 is provided. The circuitry and technology for making such a telephone are known, as evidenced by this commercially available model.

As seen in FIG. 2, a hand strap attachment 29 a battery cover release button 30 and a battery cover 31 are provided.

A feature of this prior art cellular telephone is an arm microphone 22 which is stored in a position shown in FIG. 1 and is extended to the open position shown representatively in FIG. 4 for making a call. In this model, opening the arm microphone 22 makes a call or answers an incoming call, while closing the arm microphone ends the call.

Other examples of non-axially extendable arm microphones are seen in DES. Pat. No. 352,708 and U.S. Pat. No. 5,404,390.

However, such extendable arm microphones have in the main not been aesthetically incorporated into attractive face designs for the cellular telephone and have usually been manually operated by hand between a closed and an open position. Nor have such arm microphones been spring loaded to extend automatically or semi-automatically for the convenience of the user. Thus, there is an opportunity for additional improvements to such arm microphones which are addressed by this invention.

BRIEF SUMMARY OF THE INVENTION

Directed to overcoming the above-mentioned shortcoming in the art, a general object of this invention is to provide an extendible arm microphone for a cellular telephone.

It is another overall object of this invention to provide a tubular, telescoping extendible art microphone for a cellular telephone.

It is still another overall object of this invention to provide a tubular, telescoping extendible arm microphone which is releasably spring loaded at a closed position.

According to one aspect of the invention, a microphone arm for a cellular telephone comprises a first tubular member secured to a face of a cellular telephone; a second tubular member telescopingly engaging the first tubular member between a first closed position substantially within the first tubular member and a second open position having only a portion secured within said first tubular member, the dimensions of the first tubular member being sized to accommodate the dimensions of the second tubular member in a frictional engagement which permits the second tubular member to move conveniently between the open and the closed positions; and a microphone secured to an end of the second tubular member. Preferably, the first tubular member includes a protrusion extending from a surface thereof for releasably mating with an opening in an outer wall of the first tubular member, wherein the protrusion is spring-biased to a fully-extended position by a spring in a compartment in the interior of the first tubular member, the protrusion being manually releasable from engagement with the opening in the second member.

Another feature of the invention includes means for spring-biasing the second tubular member relative to the first tubular member when in a closed position, and means for releasing the second tubular member, such as another protrusion as described above, from the first tubular member to extend under the influence of a spring to an open position. The microphone arm may further include a spring fixed at one end to the first member and at another end to the second member for biasing the second member relative to the first member when in a closed position and influencing the second member for extending the second member when the second member is released from the first member; and means for releasably securing the second member relative to the first member when in a closed position.

The first and second tubular members are congruently arcuately shaped along their length and are formed in a cross section by a lower wall, an upper wall having a dimension shorter than the lower wall, and side walls connecting the lower wall to the upper wall to define a truncated trapezoidal shape in cross-section.

The microphone arm according to the invention is used in combination with a cellular telephone. Preferably, the cellular telephone has a front face which is curved when viewed from a side in an arcuate shape similar to the arcuately-shaped microphone arm.

DETAILED DESCRIPTION OF THE PREFERRED EMBODIMENT

Figure 1:
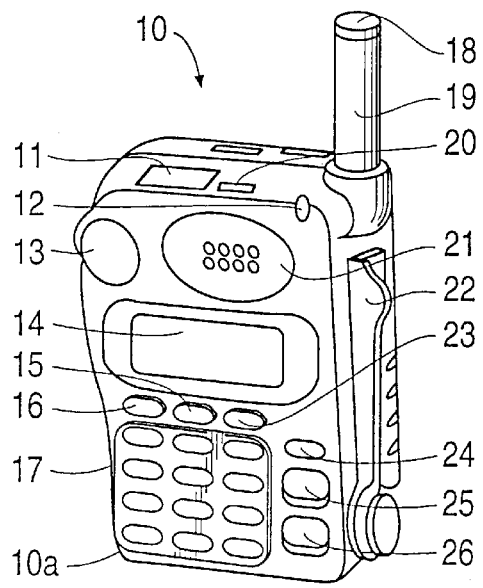
FIG. 1 is a front perspective view of a conventional cellular telephone commercially available to the art.
Figure 2:
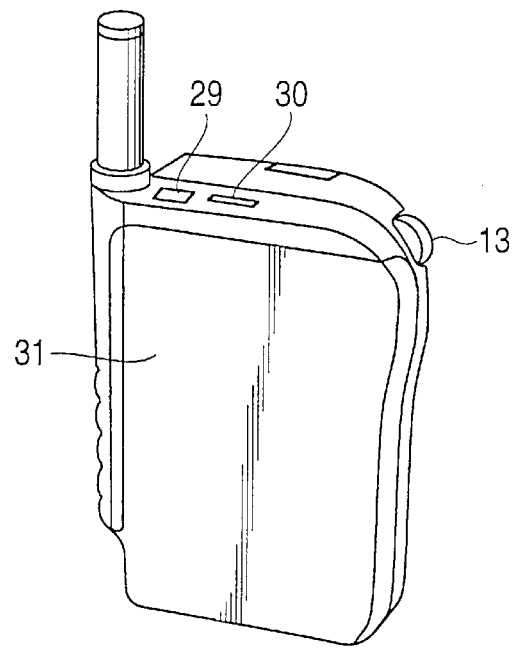
FIG. 2 is a bottom view of the conventional cellular telephone shown in FIG. 1.
Figure 3:
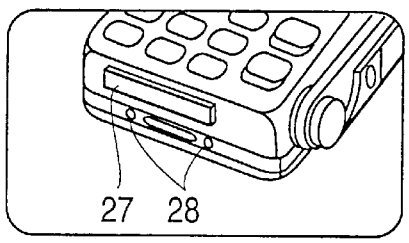
FIG. 3 is a rear view of the conventional cellular telephone shown in FIGS. 1 and 2.
Figure 4:
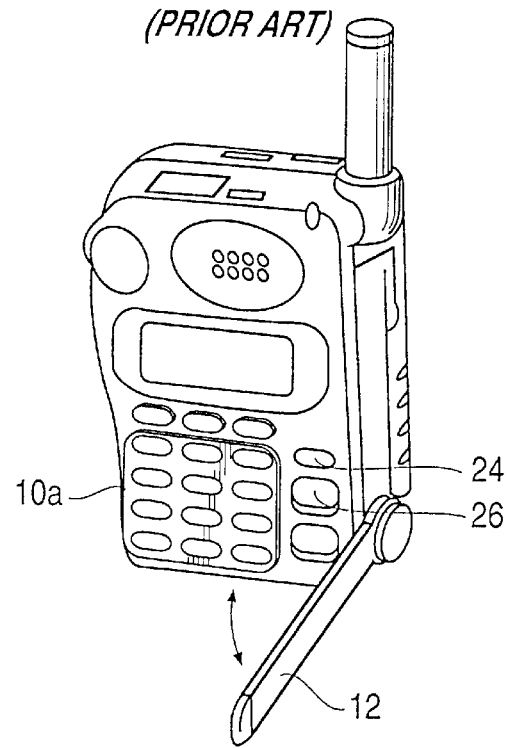
FIG. 4 is a view similar to FIG. 1 with the arm microphone extended to its open or operative position.
Figure 6:
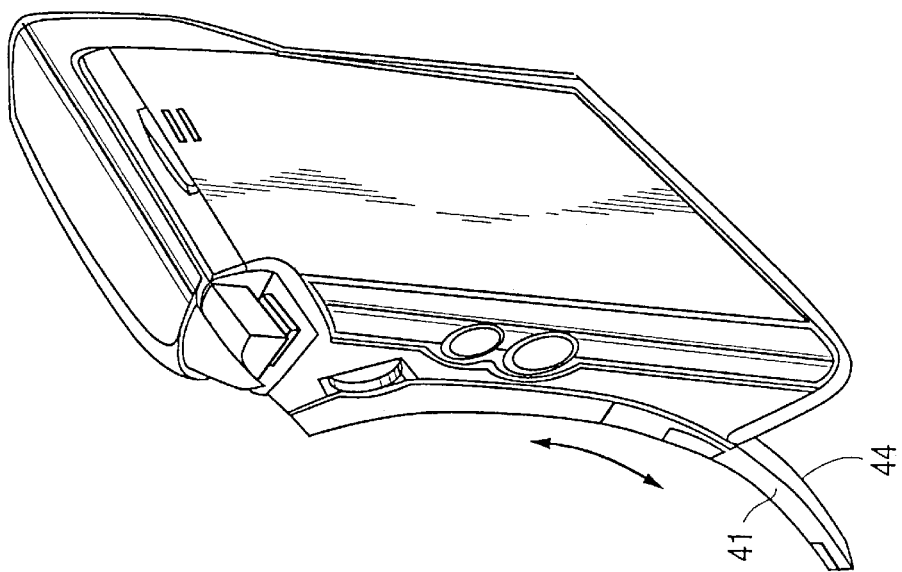
FIG. 6 is a rear perspective view of the cellular telephone of FIG. 5.
Figure 5:
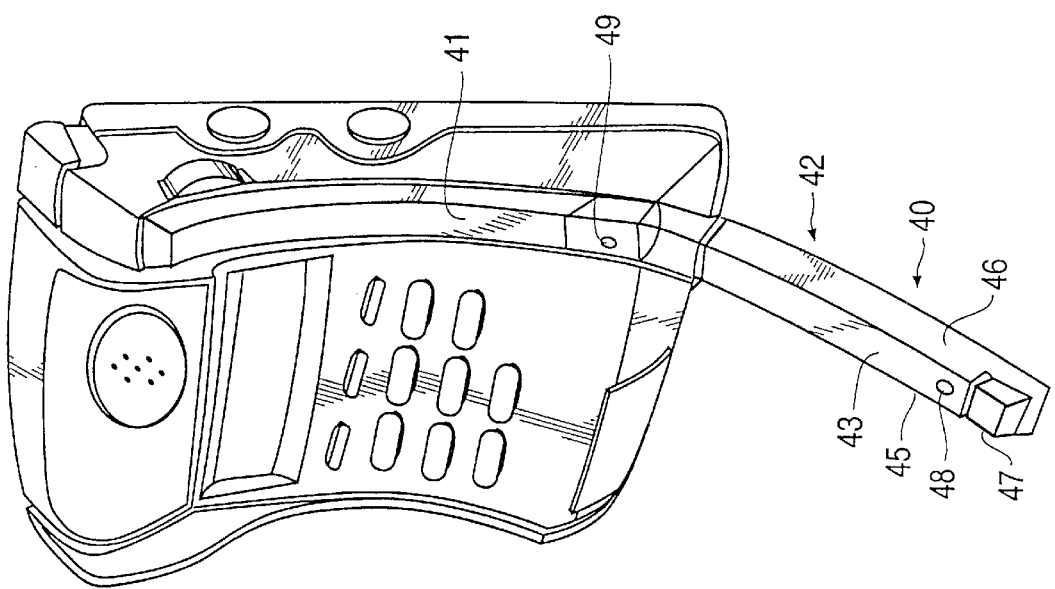
FIG. 5 is a front perspective view of the cellular telephone according to the invention with a tubular extendible arm microphone.

The cellular telephone 10 according to the invention incorporates some or all of the operating features shown and discussed in connection with the commercially available unit of FIGS. 1 to 4, except for the arm microphone. According to the invention, an extendible art microphone 40 is provided as shown in FIG. 5 in its extended position.

Preferably, the extendible arm microphone 40 is made from a telescoping pair of tubular members having a first larger dimensioned member 41 for housing a second slightly smaller dimensioned member 42 for passage into and out from the interior of the first member 41. As shown, the first and second members 41, 42 are congruently arc-shaped to permit easy insertion and withdrawal of the second member 42 from within the first member 41. The mating tubular dimension of the members 41, 42 in cross section have a narrower upper wall 43 and a wider lower wall 44 joined by side walls 45 and 46 joining the upper and lower walls 43,44. A microphone 47 is positioned at the distal end of the second telescoping member 42, and operatively connected to the cellular telephone circuit as is known in the art.

The dimensions of the telescoping members 41 and 42 are such that a frictional fit may be sufficient to retain the lower member 42 within the upper member 41 when in a closed position, while permitting easy manual withdrawal of the member 42 from within the member 41 when in use. In an alternative, a protrusion 48 on the upper surface 43 of the lower member 42 mates with an opening 49 on the upper surface of the upper telescoping member 41. The lower member 42 may thus be released by depressing the protrusion 48; for convenience, the protrusion may be spring loaded by a spring 49 in a compartment 50 diagrammatically shown in FIG. 7.

Figure 7:
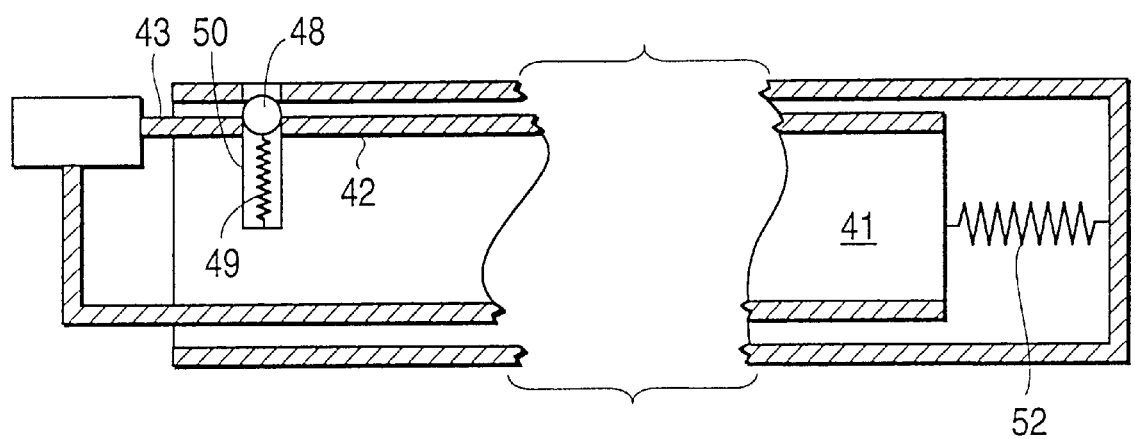
FIG. 7 is a diagrammatic view of the a telescoping arm microphone showing the arm spring loaded in its closed position secured by a depressible detent for releasing the arm to an open position.

In another embodiment diagrammatically shown in right portion of FIG. 7, the extensible, telescoping lower member 42 may itself be spring loaded by a spring 52 so that it automatically extends when the protrusion 48 shown in FIG. 8 is depressed.

While the preferred embodiment is illustrated as having two telescoping members, more than two such members may be used if desired. Moreover, the cross-sectional shape of the telescoping tubing may assume other configurations such as circular, square, rectangular, pentagonal, and the like. Still further, while the spring loaded embodiment is shown as being released by the protrusion 48, other retention and release mechanisms which are manually operated by depressing a push bottom at another location on the cellular telephone 10 may also be used.

The preferred embodiments were described to explain the principles of the invention and its practical application and alternatives may be provided within the scope of the invention as defined by the pending claims.

What is claimed is:

1. A microphone arm for a cellular telephone comprising:

a first tubular member secured on a face of a cellular telephone;

a second tubular member telescopingly engaging the first tubular member between a first closed position substantially within the first tubular member and a second open position having only a portion secured within said first tubular member, the dimensions of the first tubular member being sized to accommodate the dimensions of the second tubular member in a frictional engagement which permits the second tubular member to move conveniently between the open and the closed positions; and a microphone secured to an end of the second tubular member.

2. The microphone arm for a cellular telephone as set forth in claim 1, wherein said second tubular member includes a protrusion extending from a surface thereof for releasably mating with an opening in an outer wall of the first tubular member.

3. The microphone arm for a cellular telephone as set forth in claim 2, wherein said protrusion is spring-biased to a fully-extended position by a spring so as to engage said opening in said first tubular member, said protrusion being manually releasable from engagement with said opening in said first tubular member.

4. The microphone arm for a cellular telephone as set forth in claim 1, further including means for biasing the second tubular member relative to the first tubular member when in a closed position, and means for releasing the second tubular member from engagement with the first tubular member such that said second tubular member then extends under the influence of said means for biasing toward said open position.

5. The microphone arm as set forth in claim 1 wherein said first and said second tubular members are congruently arcuately-shaped along their length.

6. The microphone arm as set forth in claim 1 wherein said first and said second tubular members are formed in a cross section by a lower wall, an upper wall having a dimension shorter than the lower wall, and side walls connecting the lower wall to the upper wall to define a truncated trapezoidal shape.

7. The microphone arm as set forth in claim 1 further including a spring fixed at one end to said first member and at another end to the second member for biasing said second member relative to the first member when in a closed position and influencing said second member for extending said second member when said second member is released from said first member; and means for releasably securing said second member relative to the first member when in a closed position.

8. The microphone arm as set forth in claim 1 in combination with a cellular telephone.

9. The microphone arm as set forth in claim 5 in combination with a cellular telephone having a front face which is curved when viewed from a side in an arcuate shape congruent with the arcuately-shaped microphone arm.

10. A microphone arm for a cellular telephone comprising:

a first tubular member;

a second tubular member telescopingly engaging the first tubular member between a first closed position substantially within the first tubular member and a second open position having only a portion secured within said first tubular member, the dimensions of the first tubular member being sized to accommodate the dimensions of the second tubular member in a frictional engagement which permits the second tubular member to move conveniently between the open and the closed positions;

a microphone secured to an end of the second tubular member; and a spring connected between said first and second tubular members which acts to urge said second tubular member toward said open position.

11. The microphone arm for a cellular telephone as set forth in claim 10, wherein said second tubular member includes a protrusion extending from a surface thereof for releasably mating with an opening in an outer wall of the first tubular member.

12. The microphone arm for a cellular telephone as set forth in claim 11, wherein said protrusion is spring-biased to a fully-extended position by a spring so as to engage said opening in said first tubular member, said protrusion being manually releasable from engagement with said opening in said first tubular member.

13. A microphone arm for a cellular telephone comprising:

a first tubular member having a trapezoidal cross-section secured on a face of a cellular telephone;

a second tubular member telescopingly engaging the first tubular member having a trapezoidal cross-section matching that of said first tubular member, said second tubular member being slidable within said first tubular member between a first retracted position and a second extended position, the dimensions of the first tubular member being sized to accommodate the dimensions of the second tubular member in a frictional engagement which permits the second tubular member to move conveniently between the retracted and extended positions;

a microphone secured to an end of the second tubular member.

14. The microphone arm for a cellular telephone as set forth in claim 13, wherein said first and second tubular members are each curved with an arcuate shape along a length thereof.

* * * * *